Figure 1:
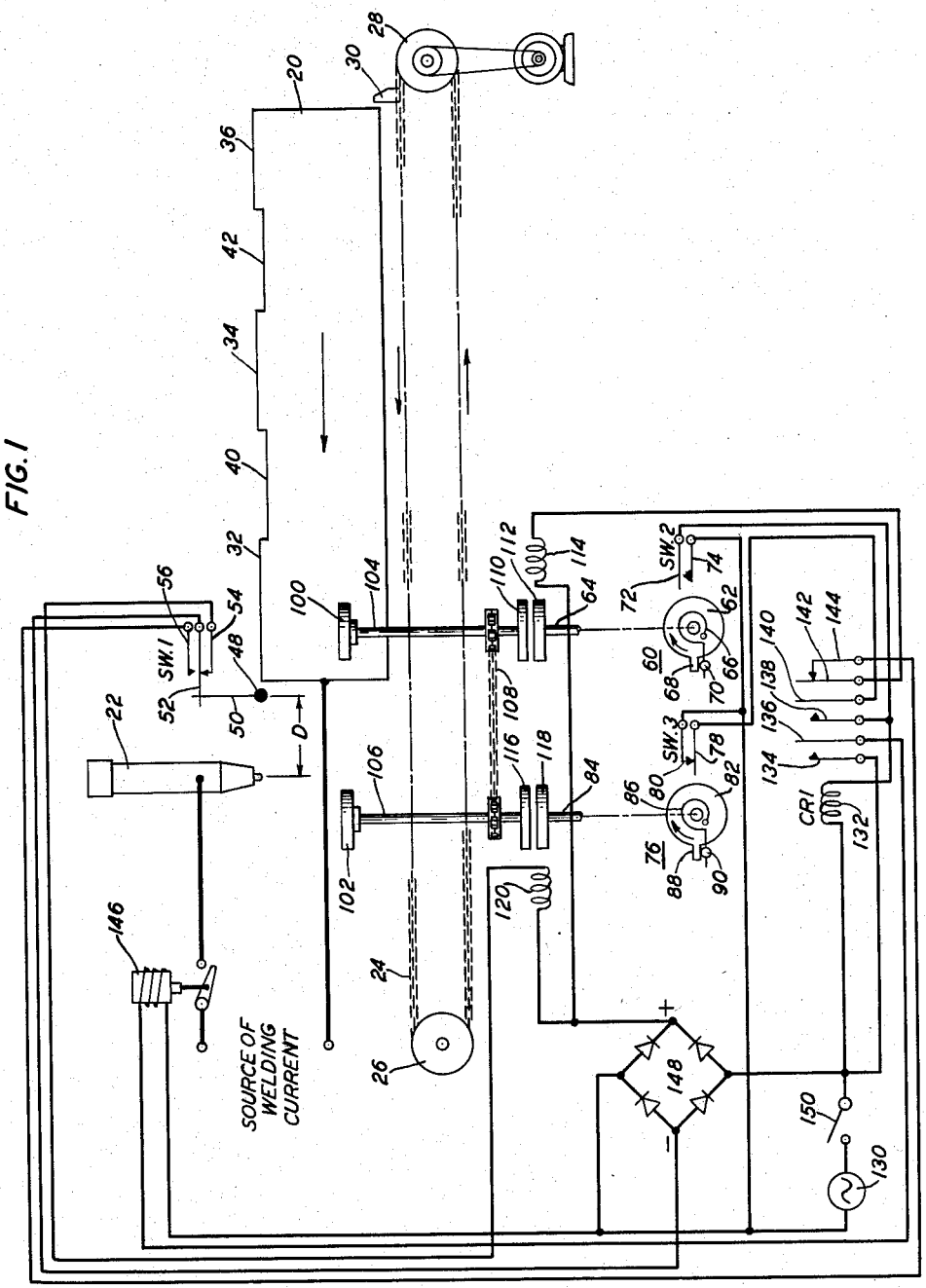

March 20, 1962 N. E. ANDERSON 3,026,405
AUTOMATIC MACHINE CONTROL
Filed Sept. 11, 1959 2 Sheets-Sheet 1

INVENTOR
NELSON E. ANDERSON
BY
*Leslie C. Byer*
ATTORNEY

INVENTOR
NELSON E. ANDERSON
BY
ATTORNEY

United States Patent Office 3,026,405
Patented Mar. 20, 1962

3,026,405
AUTOMATIC MACHINE CONTROL
Nelson E. Anderson, Berkeley Heights, N.J., assignor to Air Reduction Company, Incorporated, New York, N.Y., a corporation of New York
Filed Sept. 11, 1959, Ser. No. 839,322
12 Claims. (Cl. 219—124)

This invention relates to automatic machines and more particularly to an arrangement for starting and stopping a machine in accordance with requirements of the work, for example, in a welding operation.

An object of the invention is to perform operations automatically upon work pieces that are of random lengths or that enter the machine at irregular intervals.

Another object is to execute automatically alternate operations such as starting and ending of welds in synchronism with relative motion of the work piece and the welding torch or welding head as required in skip welding.

Where successive work pieces are not alike in their welding patterns, a fixed control arrangement such as a cam-operated micro-switch will not serve as it does not accommodate the lack of uniformity in the work pieces.

A feature of the invention is means to measure the linear dimensions of each weld and skip distance that is required together with means to store this measurement information and subsequently perform the required operations at the specific locations on the work piece.

In accordance with the invention in certain embodiments, a work engaging roller is provided, leading the welding head in its path of travel relative to the work piece. The roller is actuated by a surface characteristic such as a varying elevation or contour of the work piece to start and end welds, acting through a delayed action means which has a delay period which compensates for the travel time of the work piece from the roller to the welding head. By this means the roller "feels out" the work piece for the location of portions to be welded and portions to be skipped. The information sensed by the roller may constitute raised and depressed portions of the work piece. For example, doors to be welded may have cut-out portions for hinges and latches to be skipped over in the welding operation.

The information sensed by the roller may be stored mechanically and electrically as by means of switches, clutches, cams, etc. until the work piece is in the proper position with respect to the work performing device or tool for starting or ending an operation.

From one viewpoint, the invention provides apparatus for energizing electric circuits for controlled periods of time responsive to linear dimensions of variations or projections on a surface.

Other objects, features and advantages will appear from the following more detailed description of illustrative embodiments of the invention, which will now be given in conjunction with the accompanying drawings.

Figure 2:
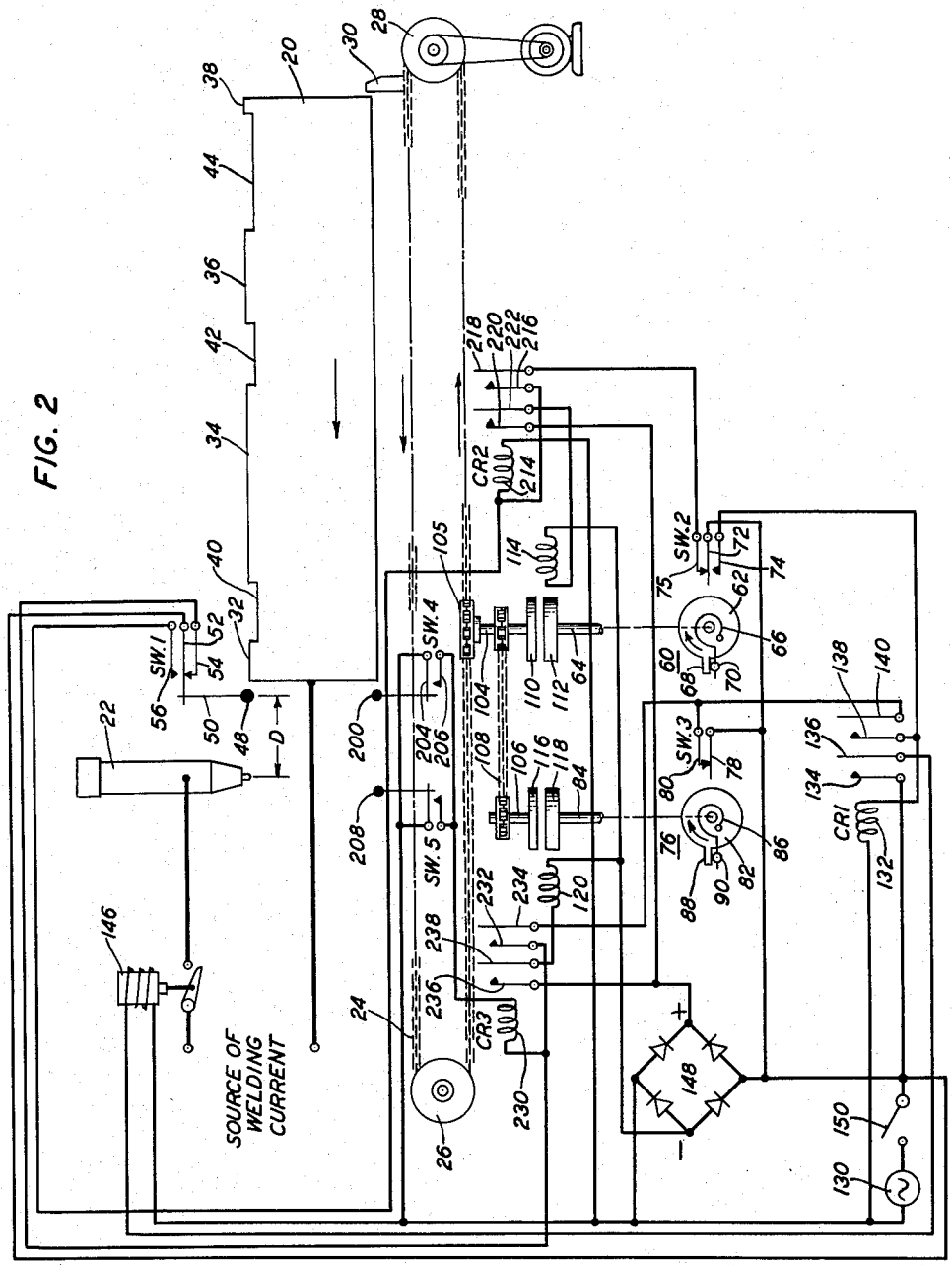

In the drawings,

FIGS. 1 and 2 respectively are schematic diagrams of two different embodiments of the invention.

In the system of FIG. 1, a work piece 20 upon which a welding operation is to be performed is shown in operative relationship to a welding head 22. For conveying the work piece to and past the welding head there is provided mechanical means comprising a conveyor chain 24 passing around a pair of wheels or rollers 26, 28, either or both of which may be power-driven. The work piece is suitably supported and is propelled toward the welding station by means of a projecting member 30 secured to the chain 24.

The portion of the work piece 20 that is presented to the welding head 22 is assumed to have relatively raised areas where welding is desired, and relatively depressed areas or cut-out portions where welding is not wanted. In the figures, examples of work pieces are shown in which areas 32, 34, 36, 38 require welding and areas 40, 42, 44 are to be skipped. The system illustrated includes means for automatically sensing the successive areas where welding or skipping is required together with synchronized clutch-operated delay cams for storing the information regarding the location of the welding and skipping areas while a transition point on the work piece is travelling between the sensing device and the welding head.

A roller switch SW1 is shown as a sensing device. This switch includes a roller 48 mounted in the path of the surface of the work piece where welding is required. When the roller 48 comes in contact with the leading edge of a raised portion of the work piece, the roller rides up onto the surface of the work piece thereby pushing up a member 50 which in turn transfers a movable switch contact 52 from a lower contact 54 to an upper contact 56. The roller 48 is biased by weight or spring action to insure that the contacts 52 and 54 are normally closed while the contacts 52 and 56 are normally open. When the roller 48 is raised, the normally closed contacts are opened and the normally open contacts are closed. When the roller 48 is lowered, as by rolling into a depressed area or by passing over the trailing edge of the work, the switch SW1 is restored to its normal condition. Thus the roller senses variations in elevation of the surface.

After any given point of the work piece passes the roller 48, the work piece travels a certain distance, D, before the given point is directly under the welding head. This lead distance D should be sufficient to give the control system time to work before the welding head is over the point where welding is to start. The distance will also need to be sufficient to provide physical clearance between the welding head and the roller switch and to protect the roller switch from the heat generated in the welding operation.

To regulate the delay between the sensing of the edge of a raised area and the beginning of welding, there is provided an "on" delay cam 60. This cam comprises a wheel 62 mounted upon a rotatable shaft 64. The shaft is arranged to be driven in a clockwise direction against the restoring force of a spring 66. The wheel 62 has a projecting stud or tooth 68 which normally comes to rest against a stop 70 but which may be caused to close a normally open switch SW2 when driven through a predetermined travel arc. The switch SW2 comprises contacts 72, 74, which are normally separated but which may be brought into contact with each other by the pressure of the stud 68 against the contact 72.

To regulate the delay between the sensing of the beginning of a depressed area and the stopping of welding, there is provided an "off" delay cam 76 which is similar to the cam 60. Associated with the cam 76, instead of a normally open switch, is a normally closed switch SW3 comprising contacts 78, 80. The cam 76 comprises a wheel 82, mounted on a shaft 84, and provided with a restoring spring 86 and a stud 88. A stop 90 is provided in conjunction with the stud 88.

For driving the delay cams 60 and 76, there are provided traction wheels 100, 102, which are driven by traction with the moving work piece and which are idle when there is no work piece in contact with either of them. The position of traction wheel 100 is such that the moving work piece begins to turn it before the leading edge of the work piece strikes the roller 48. The position of the traction wheel 102 is such that it is turned by the work piece until after the trailing edge of the work piece has passed beyond the welding head.

The traction wheels 100 and 102 are mounted on shafts 104 and 106, respectively, which shafts are mechanically coupled together as at 108 by a chain or other means. The shaft 104 is detachably coupled to the shaft 64 of the "on" delay cam 60 by means of clutch plates 110 and 112 mounted on the respective shafts. The clutch plates are provided with electrical means comprising a magnet winding 114 for engaging and releasing the clutch. The shaft 106 and the shaft 84 are similarly provided with clutch plates 116 and 118 respectively which may be controlled by means of a magnet winding 120.

A generator 130 is shown as a source of alternating currents for supplying energization to the control circuits employed. A control relay CR1 having an operating winding 132 is provided, the relay having a main contact pair 134, 136, normally open, a holding contact pair 138, 140, also normally open, and a control contact pair 142, 144, normally closed. The winding 132 of the relay CR1 is connected across the lines from the generator 130 through two parallel paths. One of these paths includes the normally open contact pair 138, 140 in series with the normally closed switch SW3. The other path is by way of the normally open switch SW2. Completion of the welding circuit to the welding head 22 and the work piece 20 from a source of welding current supply is controlled by the energization of a winding 146 of a welding contactor having its normally open contacts connected in the welding circuit. The winding 146 of this welding contactor is connected across the generator 130 by way of the normally open contacts 134, 136 of the relay CR1. A full wave rectifier 148 connected across generator 130 supplies direct current to the windings of the "on" delay clutch and the "off" delay clutch. The path from the positive output terminal of the rectifier 148 through the winding 114 of the "on" delay clutch is by way of the normally closed contact pair 142, 144, of the relay CR1 in series with the normally open contactcs 52, 56 of switch SW1 to the negative terminal of the rectifier. The path from the positive terminal of the rectifier through the winding 120 of the "off" delay clutch is by way of the normally closed contacts 52, 54 of the switch SW1 to the negative terminal of the rectifier. An on-off switch 150 is provided for the generator 130.

In the operation of the system of FIG. 1, when the switch 150 is closed, and the conveyor chain is in operation, if a work piece is placed upon the conveyor in front of the projection 30, the work piece will be carried to the left as shown in the figure. When the work piece reaches the traction wheel 100 it will start to turn that wheel. Next, the leading edge of the work piece will reach the roller 48. As soon as the roller 48 is lifted by a raised portion of the work piece, switch SW1 is operated to transfer contact 52 from contact 54 to contact 56. The winding 114 of the "on" delay cam is thereupon energized through contacts 142, 144, 56 and 52, operating the "on" delay clutch and starting the cam 60 rotating by power transmitted from the moving work piece through the wheel 100, shaft 104, the "on" delay clutch, and the shaft 64.

The travel arc of the cam 60 is set so that the time required for the stud 68 to travel from the stop 70 to the position where it closes switch SW2 corresponds to the time required for the work piece to travel approximately the distance D. In some cases, it may be desired to provide an unwelded terminal portion before starting the weld. For this purpose, the travel arc of the cam 60 may be lengthened to produce the desired amount of unwelded distance.

When the cam 60 has completed its travel arc, the stud 68 closes the switch SW2, thereby connecting the winding of the control relay CR1 directly across the lines from the generator 130. The resulting energization and operation of the control relay closes the contact pair 134, 136, thereby energizing the winding of the welding contactor which closes its contacts to complete the welding circuit and start the welding operation, the welding head now being over the point on the work piece where it is required that the welding start.

The operation of the control relay CR1 also closes the contact pair 138, 140 of the relay, thereby completing a holding circuit for the relay through the contacts 138, 140 and the normally closed contacts of the switch SW3. The relay CR1 by operating also opens its contacts 142, 144, thereby disconnecting the winding 114 of the "on" delay clutch, permitting the spring 66 to return the cam 60 to normal position with the stud 68 resting against the stop 70. As the cam returns, the switch SW2 opens, but this does not de-energize the control relay, because the relay remains energized through its holding circuit. It will be noted that the winding 120 of the "off" delay clutch is open-circuited at the contacts 52, 54 of switch SW1 as long as contact 52 is connected to contact 56, only one of the clutches being operable at any given time.

When the work piece has moved to the position where the roller 48 rolls down over the trailing edge of the raised portion 32 into the depressed portion 40, the switch SW1 returns to normal, transferring the contact 52 from contact 56 to contact 54. The closure of contacts 52 and 54 causes the "off" delay clutch to operate thereby starting the turning of the "off" delay cam 76 by means of power transmitted from the moving work piece through one or both of the traction wheels 100, 102, the shaft 106, the "off" clutch, and the shaft 84.

The travel arc of the cam 76 is set so that the time required for the stud 88 to travel from the stop 90 to the position where it opens the switch SW3 corresponds to the time required for the work piece to travel approximately the distance D. In order to provide an unwelded terminal portion immediately adjacent to a skip area, the travel arc of the cam 76 may be shortened to provide the desired amount of unwelded distance.

When the cam 76 has completed its travel arc, the stud 88 opens the switch SW3, thereby breaking the holding circuit of the control relay CR1 and stopping the welding process. The de-energization of the control relay also closes the contacts 142, 144, thereby conditioning the operating circuit of the "on" delay clutch preparatory to the next raising of the roller 48.

The operation repeats itself as the roller switch senses successive raised and depressed portions of the work piece. Because the "on" cam and the "off" cam cannot be used simultaneously in the system of FIG. 1, it is necessary that the timing operation preparatory to starting a weld be completed before the beginning of a timing operation preparatory to a skip. Likewise if the timing operation preparatory to stopping a weld is in progress, it is necessary that this timing operation be completed before the beginning of a timing operation preparatory to starting another weld. This means that the distance D must be less than any "weld length" or "skip length" that is desired. In many cases, the practical minimum value of the distance D will be sufficiently small to accommodate the shortest weld or skip distance encountered in the work. Where this limitation is not acceptable, however, a modified system shown in FIG. 2 and described below may be used.

When the last raised portion of the work piece has passed the roller 48, the regular "off" delay timing operation starts as above described and because the work is still in contact with the traction wheels, 100, 102 or at least with wheel 102, the mechanical drive of the "off" delay cam continues while the cam completes its travel arc. Accordingly the welding continues until the last required weld is completed, whereupon the control relay is de-energized.

When the work piece passes beyond the last traction wheel 102, power is no longer supplied to the cams, and immediately thereafter both cams will be against their respective stops. The circuit of the "on" clutch winding 114 is open at the contacts 52, 56 of switch SW1.

The clutch winding 120 is energized through contacts 52, 54 of SW1, but as the shaft 104 is not turning, the cam 76 is not turned. When another work piece is inserted, the winding 120 is de-energized by the opening of the contacts 52, 54 when the roller 48 first strikes a raised portion of the work piece.

In the system shown in FIG. 2 two additional control relays are provided compared to the system of FIG. 1. One of these relays, CR2, controls the energization of the "on" delay clutch and the other, CR3, controls the energization of the "off" delay clutch. By employing these relays instead of the direct control of the clutch windings by means of the roller switch SW1, the "on" delay cam and the "off" delay cam may be used simultaneously for timing partially overlapping delay periods. With this arrangement it is not necessary that the cycle of either of the cams be completed before the other cam may be brought into use, since the switch SW1 may be operated in either direction without breaking the energizing circuit of a clutch that has previously been engaged. Consequently, both of the clutches may be engaged successively during the period of time which represents a travel of the distance D. Each associated cam will then time a welding period or a skip period as the case may be, without interruption in the cycle of either cam. If the sum of a weld length and an immediately adjacent skip distance is less than D, a third delay period will start before the first delay period is completed. It will be noted that the cam which is timing the first delay period will not have completed its cycle and therefore is not available to start a new cycle. The system as shown is so arranged that the switch SW1 has no effect upon a control relay which is already energized. This system will take care of two partially overlapping delay periods. If required, additional control relays, clutches and delay cams may be provided to take care of three or more delay periods as when a total of three or more weld lengths and skip lengths occurs within a given length D of the work. In many practical cases this will not be necessary.

The system of FIG. 2 includes a positive drive from the conveyor chain to the clutches in place of the less positive drive from the conveyor chain through the work piece and the traction wheels as shown in the system of FIG. 1. By means of the direct drive in the system of FIG. 2 the clutches are positively synchronized with the motion of the conveyor chain and therefore with the motion of the work piece when one is in the machine. In order to avoid unnecessary, energization of the control relay CR3 when there is no work piece in the machine, two limit switches are provided to sense the presence of any portion of the work piece beneath the welding head.

Referring to FIG. 2, the switch SW2 is provided with a normally closed portion comprising an additional contact 75, normally in contact with the contact 72 and adapted to break this contact at the end of the cycle of the "on" delay cam 60 when the stud 38 presses against the contact 72. Since the cam will usually be very slow moving, the switch SW2 should be of the type such that pressure on the contact 72 causes that contact to snap over, making a momentary contact with contact 74, the contact 72 then automatically snapping back against contact 75 after release of pressure on contact 72. In case the momentum of the cam is sufficient to close the contacts 72, 74 before the spring 66 reverses the motion of the cam, a special type of switch is not needed.

The shaft 104 is provided with means such as a sprocket wheel 105 which meshes with the conveyor chain 24 to provide a positive drive for the clutch plate 110 through the shaft 104 and for the clutch plate 116 through the shaft 104, the coupling means 108 and the shaft 106.

The roller switch SW4 is provided, having a roller 200 positioned to be depressed by the lower leading edge of the work piece at substantially the same instant that the upper leading edge of the work piece reaches the roller 48 of SW1. The switch SW4 is provided with contacts 204 and 206 which are brought together when the roller 200 is depressed and are separated when this roller is raised. The roller 200 is suitably biased to make SW4 normally open.

The roller switch SW5 has a roller 208 which is positioned somewhat beyond the welding head. This roller is depressed by the lower leading edge of the work piece and is released when the lower trailing edge has passed beyond the working range of the welding head. The roller is suitably biased to make SW5 normally open.

The switches SW4 and SW5 have their respective contacts connected in parallel.

The winding 214 of the relay CR2 is arranged to be connected to the power source 130 by way of the normally open contact 52, 56 of the switch SW1. The relay has a self-holding contact pair 216, 218, serially connected with the normally closed contacts 72, 75 of the switch SW2 to form a path parallel with the path through the contacts 52, 56. The relay CR2 has normally open control contacts 220, 222 in circuit with winding 114 of the "on" delay cam 60.

The winding 230 of the relay CR3 is arranged to be connected to the source 130 through one or both of the switches SW4 and SW5 and the normally closed contacts 52, 54 of the switch SW1. The relay CR3 has a self-holding contact pair 232, 234 connected serially with the normally closed switch SW3 to form a path parallel with the path through the contacts 52, 54, of SW1. The relay also has normally open control contacts 236, 238 in circuit with winding 120 of the "off" delay cam 76.

The main control relay CR1 is connected into the system in the same way as in the arrangement of FIG. 1 except that the holding circuit for the relay CR1 in passing through the normally closed switch SW3 shares this switch with the holding circuit for the relay CR3. The contacts 142, 144 shown in FIG. 1 need not be provided for the relay CR1 as used in FIG. 2.

In the operation of the system of FIG. 2, when the work piece first presents a raised portion to operate the switch SW1, the relay CR2 is energized through contacts 52 and 56 of the switch. The holding circuit for this relay is immediately completed through the contacts 216, 218 of the relay and the normally closed contacts 72, 75 of the switch SW2. The closing of the contacts 220, 222 of the relay completes the energizing circuit for the "on" clutch winding 114, thereby starting the cycle of the "on" delay cam 60. Subsequent opening of the contacts 52, 56 of the switch SW1 when the roller 48 runs into a depressed area of the work piece as at 40 while the holding circuit of the relay CR2 is complete will not interrupt the cycle of the cam 60. The cycle will continue until the energizing circuit of the relay CR2 is broken by the separation of the contacts 72 and 75 of SW2 initiated by the cam 60 at the end of its travel arc.

When the roller 48 passes from a raised to a depressed portion of the work piece, the switch SW1 opens at contacts 52, 56 and closes at contacts 52, 54. It will be noted that if there is no work piece in the machine, SW1, although it is normally closed at the contacts 52, 54 does not energize the relay CR3, due to the fact that neither of the parallel-connected switches SW4 nor SW5 is closed. As soon as the work piece strikes the roller 200, switch SW4 closes and the relay CR3 may thereafter be energized by the closing of the contacts 52, 54. This control of the relay CR3 by the contacts 52, 54 continues in effect until the trailing edge of the work piece has passed beyond both the roller 200 and the roller 208 allowing the switches SW4 and SW5 to open successively, thereby deconditioning the energizing circuit of the relay.

The energization of the relay CR3 closes this relay's holding circuit through the contacts 232, 234 and the normally closed switch SW3. Subsequent opening of the contacts 52, 54 of the switch SW1 will not break the holding circuit of the relay CR3. The energization of the relay causes the energization of the winding 120 through the contacts 236 and 238. The cam 76 is thereby started upon its travel arc and will continue without interruption until it separates the contacts 78, 80 of the switch SW3 thereby breaking its own energizing circuit at the end of its travel arc.

When its travel arc has been completed by the "on" delay cam 60, the resultant momentary closing of the contacts 72, 74 completes the energizing circuit for the main control relay CR1 which locks itself in through its holding contacts and by closing its contacts 134, 136, energizes the winding 146 of the welding contractor which closes its contacts to supply welding current to the welding head 22 and start the welding operation. The welding operation continues until the "off" delay cam 76 has been started and has completed its travel arc, thereby opening the switch SW3 and breaking the holding circuit of the relay CR1 and consequently de-energizing the welding contactor and cutting off the supply of power to the welding head.

It will be noted that the opening of the switch SW3 de-energizes the relays CR1 and CR3 simultaneously, thereby restoring the "off" delay cam to normal at the same time that the welding operation is stopped.

While embodiments in a welding machine are illustrated it should be understood that the invention is not necessarily limited to welding but the same principles may be applied to other processes, for example spraying or rolling on of paint or the like. Accordingly, various work performing devices or tools may be substituted for the welding head illustrated herein.

While doors to be welded will ordinarily be fed into the machine in an edgewise manner, it is contemplated that in general work pieces may also be presented flatwise in a welding machine or other automatic machine for processing.

Although individual work pieces may require alternate welds and skip areas, the invention is evidently applicable equally well to processing of work pieces which require no skipping but which are of random length or are fed into the machine at irregular intervals so that the machine cannot be set up to follow any predetermined program. In such cases, the invention provides an arrangement for starting and stopping the process automatically to fit the requirements of the work.

It will be noted that the work piece may be held stationary and the welding head and roller switches may move over the work piece, thereby producing the necessary relative motion between the work performing device and the work piece. In either case, the relative positions of the welding head and the roller switches remain constant.

The positive drive system for the cams as shown in FIG. 2 may be used with the single-relay control system shown in FIG. 1 or the drive system using the traction wheels bearing upon the work piece as shown in FIG. 1 may be used with the modified control system shown in FIG. 2.

While illustrative forms of apparatus in accordance with the invention have been described and shown herein, it will be understood that numerous changes may be made without departing from the general principles and scope of the invention.

What is claimed is:

1. Apparatus for energizing electric circuits in accordance with linear measurements of dimensions of projections on a surface, comprising, in combination, switching means responsive to variations in the lengths of said projections on said surface, first and second delayed action means responsive to said switching means, circuit energizing means responsive to the first said delayed action means, and circuit de-energizing means responsive to the said delayed action means.

2. In an automatic machine, in combination, a work performing device, means to produce relative motion between said device and a work piece to bring successive portions of said work piece into working relationship with said work performing device, automatic sensing means for sensing in advance of said work piece arriving at said work performing device the variations in elevation of a surface of said work piece to distinguish between raised and depressed areas of said surface, and delayed action means responsive to the operation of said automatic sensing means for controlling the energization of said work performing device in accordance with the sensed variations in elevation of the surface of the work piece when said successive portions of said work piece producing said sensed variations are in working relationship with said work performing device.

3. In an automatic machine, in combination, a work performing device, work piece positioning means to produce relative motion between said device and a work piece to bring successive portions of said work piece into working relationship with said work performing device, elevation sensing means in spaced relation to said work performing device, and actuated by said work piece positioning means thereby bringing said sensing means into sensing relationship with a surface of said work piece in advance of the positioning of the work performing device with respect to the same portion of the work piece, and delayed action means to control the operation of the work performing device in accordance with a given sensed variation in the work piece when the work performing device is in position opposite the portion of the work piece where the variation was sensed; the delay time of said delayed action means being equal to the time required to bring the work performing device and the work piece into the said relative position.

4. In an automatic machine, in combination, a tool, means to produce relative motion between said tool and a work piece to bring successive portions of the work piece into operative relation to said tool, contour sensing means mounted at a fixed distance from said tool in a position to come opposite a given point of the work piece in advance of the tool, and delayed action means actuable by said sensing means in response to a change in the contour of said work piece for controlling the supply of energy to said tool when the tool is in operative relation with respect to the point on the work piece where the corresponding change in contour was sensed, the delay time of said delayed action means being equal to the time required to bring the tool and the said point on the work piece into the said operative relation.

5. In an automatic machine, in combination, a work performing member, means to produce relative motion between said member and a work piece, to bring successive portions of the work piece opposite the said work performing member in operative relation thereto, contour sensing means mounted at a fixed distance from said work performing member in a position to come opposite a given point of the work piece in advance of the work performing member, and delayed action means actuable by said sensing means in response to changes in contour of said work piece for controlling the energization of said work performing member when the work performing member is opposite the point on the work piece where the corresponding change in contour is located, the delay time of said delayed action means being equal to the time required for the work piece to move over the said fixed distance relatively to said work performing member.

6. In an automatic machine, in combination, a tool, means to produce relative motion between said tool and a work piece, to bring successive portions of the work piece opposite the tool in operative relation thereto, contour sensing means mounted at a fixed distance from said tool in a position to come opposite a given point of the work piece in advance of the tool, "on" delayed action means operated by said sensing means in response to a change of contour in one direction or sense, means actuable by said delayed action means at the end of its delay period to energize said tool to start an operation upon said work piece, "off" delayed action means operated by said sensing means in response to a change of contour in the opposite direction or sense, and means actuable by said "off" delayed action means at the end of its delay period to de-energize said tool to stop said operation, each said delay period being equal to the time required for the work piece to move over the said fixed distance relatively to said tool.

7. In an automatic machine, in combination, a tool, means to produce relative motion between said tool and a work piece to bring successive portions of the work piece into operative relationship with said tool, contour sensing means mounted at a fixed distance from said tool in a position to come opposite a given point of the work piece in advance of the tool, rotatable delay means actuable by said sensing means in response to a change of contour of the work piece, means adapted to be propelled by the motion of the work piece to rotate said delay means, clutch means for controlling said rotatable means, electrical means operable by said delay means at the completion of a predetermined arc of rotation to perform a control operation upon said tool and to disengage said clutch, and biasing means to restore said delay means to a starting position when said clutch means is disengaged, the time required for said delay means to complete its arc of rotation being equal to the time required for the work piece to move over the said distance relatively to said tool.

8. In a control system for an automatic welding machine, in combination, means for propelling a work piece along a path which includes a welding station, means adjacent to said path at a fixed distance from said welding station for sensing a surface characteristic of the work piece, an "on" delay cam, an "off" delay cam, means for connecting said cams to said workpiece propelling means including individual clutches associated with the respective cams, means controlled by said sensing means for selectively engaging said clutches, a control relay for controlling a welding operation at said welding station, means actuated by said "on" delay cam at the end of its delay period for energizing said control relay to start a welding operation, a holding circuit for said control relay, means actuated by said "off" delay cam at the end of its delay period for breaking said holding circuit to stop said welding operation, and means for releasing each said clutch at the end of the delay period of the respective cam, each said delay period being equal to the time required by said propelling means to move the work piece over the said fixed distance relatively to said welding station.

9. In a control system for an automatic welding machine, in combination, a control relay having a normally open main contact, a holding contact, and a normally closed auxiliary contact; an "on" delay cam, means biasing said "on" delay cam to a starting position, work piece propelling means, an "on" delay clutch for connecting said propelling means in propelling relation to said "on" delay cam, an "off" delay cam, means biasing said "off" delay cam to a starting position, an "off" delay clutch for connecting said propelling means in propelling relation to said "off" delay cam, two-position sensing means actuable into a first position in response to a first surface characteristic of a work piece for energizing said "on" delay clutch by way of said normally closed auxiliary contact of said control relay and actuable into a second position in response to a second surface characteristic of the work piece for energizing said "off" delay clutch, said sensing means being located at a fixed distance from a welding position in said machine, means actuated by said "on" delay cam at the end of a predetermined delay period to energize said control relay, thereby closing said main contact and opening said normally closed contact to release said "on" delay clutch for returning said "on" delay cam to its starting position, means actuated by said "off" delay cam at the end of a predetermined delay period to break the holding circuit of said control relay, said sensing means being so arranged that when it operates to energize said "on" delay clutch it breaks the energizing circuit of the said "off" delay clutch to release said clutch thereby returning said "off" delay cam to its starting position, each said time delay period being equal to the time required by said propelling means to move the work piece over the said fixed distance relatively to said welding position.

10. In a control system for an automatic welding machine, in combination, a main control relay having a normally open control contact and a holding contact, an "on" delay cam, work piece propelling means, an "on" delay clutch for connecting said propelling means in propelling relation to said "on" delay cam, means biasing said "on" delay cam to a starting position, an "on" delay control relay having a normally open control contact and a holding contact, an "off" delay cam, means biasing said "off" delay cam to a starting position, an "off" delay clutch for connecting said propelling means in propelling relation to said "off" delay cam, an "off" delay control relay having a normally open control contact and a holding contact, sensing means actuated in response to a first surface characteristic of a work piece for selectively energizing said "on" delay control relay thereby closing the control contact thereof, said contact serving to energize said "on" delay clutch, said sensing means being actuated in response to a second surface characteristic of the work piece for energizing said "off" delay control relay thereby closing the control contact thereof, said contact serving to energize said "off" delay clutch, said sensing means being located at a fixed distance from a welding position in said machine, means actuated by said "on" delay cam at the end of a predetermined delay period to energize said main control relay, thereby closing the said control contact of said main control relay for starting a welding operation, further means actuated by said "on" delay cam at the end of said delay period to break the holding circuit of said "on" delay control relay thereby releasing said "on" delay clutch for returning said "on" delay cam to its starting position, means actuated by said "off" delay cam at the end of a predetermined delay period to break the holding circuit of said main control relay for stopping said welding operation, and to break the holding circuit of said "off" delay control relay, thereby releasing said "off" delay clutch for returning said "off" delay cam to its starting position, each said delay period being equal to the time required by said propelling means to move the work piece through said fixed distance relatively to said welding position.

11. Apparatus in accordance with claim 10, together with means to condition said "off" delay control relay according to whether there is a work piece in welding position in the machine.

12. Apparatus for energizing electric circuits for controlled periods corresponding to linear measurements of dimensions of projections on a surface, comprising, in combination, first measurement storage means designed and adapted to store information relative to the starting point of a given projection, second measurement storage means designed and adapted to store information relative to the ending point of said projection, circuit energizing means responsive to said first measurement storage means, and circuit de-energizing means responsive to said second measurement storage means.

References Cited in the file of this patent
UNITED STATES PATENTS

| 2,049,332 | Snyder | July 28, 1936 |
| 2,565,655 | Giraudo | Aug. 28, 1951 |
| 2,568,554 | McClay | Sept. 18, 1951 |
| 2,888,626 | Macoy | May 26, 1959 |

UNITED STATES PATENT OFFICE
CERTIFICATE OF CORRECTION

Patent No. 3,026,405                                March 20, 1962

Nelson E. Anderson

It is hereby certified that error appears in the above numbered patent requiring correction and that the said Letters Patent should read as corrected below.

Column 3, line 36, for "contactcs" read -- contacts --; column 7, line 12, for "contractor" read -- contactor --; line 73, after "the" insert -- second --.

Signed and sealed this 7th day of August 1962.

(SEAL)
Attest:

ERNEST W. SWIDER
Attesting Officer

DAVID L. LADD
Commissioner of Patents